United States Patent
Wilson et al.

(10) Patent No.: US 11,303,683 B2
(45) Date of Patent: Apr. 12, 2022

(54) METHODS AND SYSTEMS FOR MANAGING DISTRIBUTION OF ONLINE CONTENT BASED ON CONTENT MATURITY

(71) Applicant: INTERNATIONAL BUSINESS MACHINES CORPORATION, Armonk, NY (US)

(72) Inventors: John Wilson, League City, TX (US); Shikhar Kwatra, Durham, NC (US); Paul Krystek, Highland, NY (US); Sarbajit Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/201,063

(22) Filed: Nov. 27, 2018

(65) Prior Publication Data

US 2020/0169588 A1    May 28, 2020

(51) Int. Cl.
*H04L 65/611*    (2022.01)
*G06N 20/00*    (2019.01)
*G06N 5/02*    (2006.01)

(52) U.S. Cl.
CPC ........... *H04L 65/4076* (2013.01); *G06N 5/02* (2013.01); *G06N 20/00* (2019.01)

(58) Field of Classification Search
CPC ....... H04L 65/4076; G06N 20/00; G06N 5/02
See application file for complete search history.

(56) References Cited

U.S. PATENT DOCUMENTS

| | | |
|---|---|---|
| 7,299,222 B1 | 11/2007 | Hogan et al. |
| 8,825,644 B1 | 9/2014 | Crichton et al. |
| 8,825,759 B1 * | 9/2014 | Jackson ............... G06Q 10/105 |
| | | 707/723 |
| 9,292,830 B2 | 3/2016 | Fleet et al. |
| 9,799,081 B1 * | 10/2017 | Lewis .................... G06Q 50/01 |
| 10,152,544 B1 | 12/2018 | Friggeri et al. |
| 10,547,582 B1 | 1/2020 | Kwatra |
| 2010/0131385 A1 * | 5/2010 | Harrang ............. G06Q 30/0631 |
| | | 705/26.1 |
| 2012/0167010 A1 | 6/2012 | Campbell et al. |
| 2013/0103814 A1 | 4/2013 | Carrasco et al. |
| 2013/0246521 A1 | 9/2013 | Schacht et al. |
| 2013/0290820 A1 | 10/2013 | Dhanani |
| 2014/0223289 A1 | 8/2014 | Zheng |
| 2014/0237093 A1 | 8/2014 | Hofman |
| 2014/0280236 A1 * | 9/2014 | Faller ..................... H04L 51/32 |
| | | 707/749 |
| 2015/0067849 A1 | 3/2015 | Agrawal |
| 2015/0081449 A1 | 3/2015 | Ge et al. |
| 2015/0286662 A1 | 10/2015 | Marra et al. |

(Continued)

FOREIGN PATENT DOCUMENTS

CA    3045190 A1 *   7/2018   ............. G06Q 50/01

*Primary Examiner* — John A Follansbee
*Assistant Examiner* — Fadi Haj Said

(57) ABSTRACT

Embodiments for managing distribution of online content by one or more processors are described. Content posted to an online channel is detected. The content is viewable by a first number of viewers. A maturity score for the content is calculated. If the calculated maturity score is above a predetermined threshold, the content is caused to be viewable by a second number of viewers. The second number is greater than the first number.

12 Claims, 8 Drawing Sheets

(56) References Cited

U.S. PATENT DOCUMENTS

| | | |
|---|---|---|
| 2015/0370830 A1* | 12/2015 | Murphy-Chutorian ............... G06Q 10/00 707/748 |
| 2016/0179965 A1 | 6/2016 | Bhatia |
| 2016/0328481 A1 | 11/2016 | Marra et al. |
| 2017/0068722 A1 | 3/2017 | Wang et al. |
| 2018/0039644 A1 | 2/2018 | Bonanni et al. |
| 2018/0183852 A1 | 6/2018 | Jackson et al. |
| 2018/0285984 A1 | 10/2018 | Ayachitula et al. |
| 2018/0293278 A1* | 10/2018 | Kapoor ................. G06Q 50/01 |
| 2019/0102466 A1 | 4/2019 | Wang et al. |
| 2020/0134095 A1 | 4/2020 | Weldemariam |

* cited by examiner

METHODS AND SYSTEMS FOR MANAGING DISTRIBUTION OF ONLINE CONTENT BASED ON CONTENT MATURITY

BACKGROUND OF THE INVENTION

Field of the Invention

The present invention relates in general to computing systems, and more particularly, to various embodiments for managing online content based on relationships of the content creator.

Description of the Related Art

When content is posted to (or on) an online channel, such as a social media platform, other users or viewers (e.g., besides the original poster or content creator), such as "friends" or "contacts" of the content creator, are often able to post comments and ask questions about the content (i.e., post/create viewer engagement components), which typically appear in a dedication portion or panel, such as below the original content. For example, if some aspects of the original content are not clear to some of the viewers, they may post questions asking for clarification. Additionally, the content creator may also post comments to, for example, respond to other comments, answer questions, and/or provide additional information.

The viewer engagement components posted, either by viewers or the content creator, along with the nature (e.g., subject matter, details provided, etc.) of the content, may be considered to be representative or illustrative of the "maturity" of the content. That is, as viewer engagement components are posted to the content, the content may be thought of as becoming more mature.

Some viewers, perhaps depending on their relationship with the content creator, may be interested in and/or interact with the content while the content is relatively "immature," while others only take notice of and/or interact with the content after a certain amount of maturity has been achieved.

SUMMARY OF THE INVENTION

Various embodiments for managing distribution of online content by one or more processors are described. In one embodiment, by way of example only, a method for managing distribution of online content, again by one or more processors, is provided. Content posted to an online channel is detected. The content is viewable by a first number of viewers. A maturity score for the content is calculated. If the calculated maturity score is above a predetermined threshold, the content is caused to be viewable by a second number of viewers. The second number is greater than the first number.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
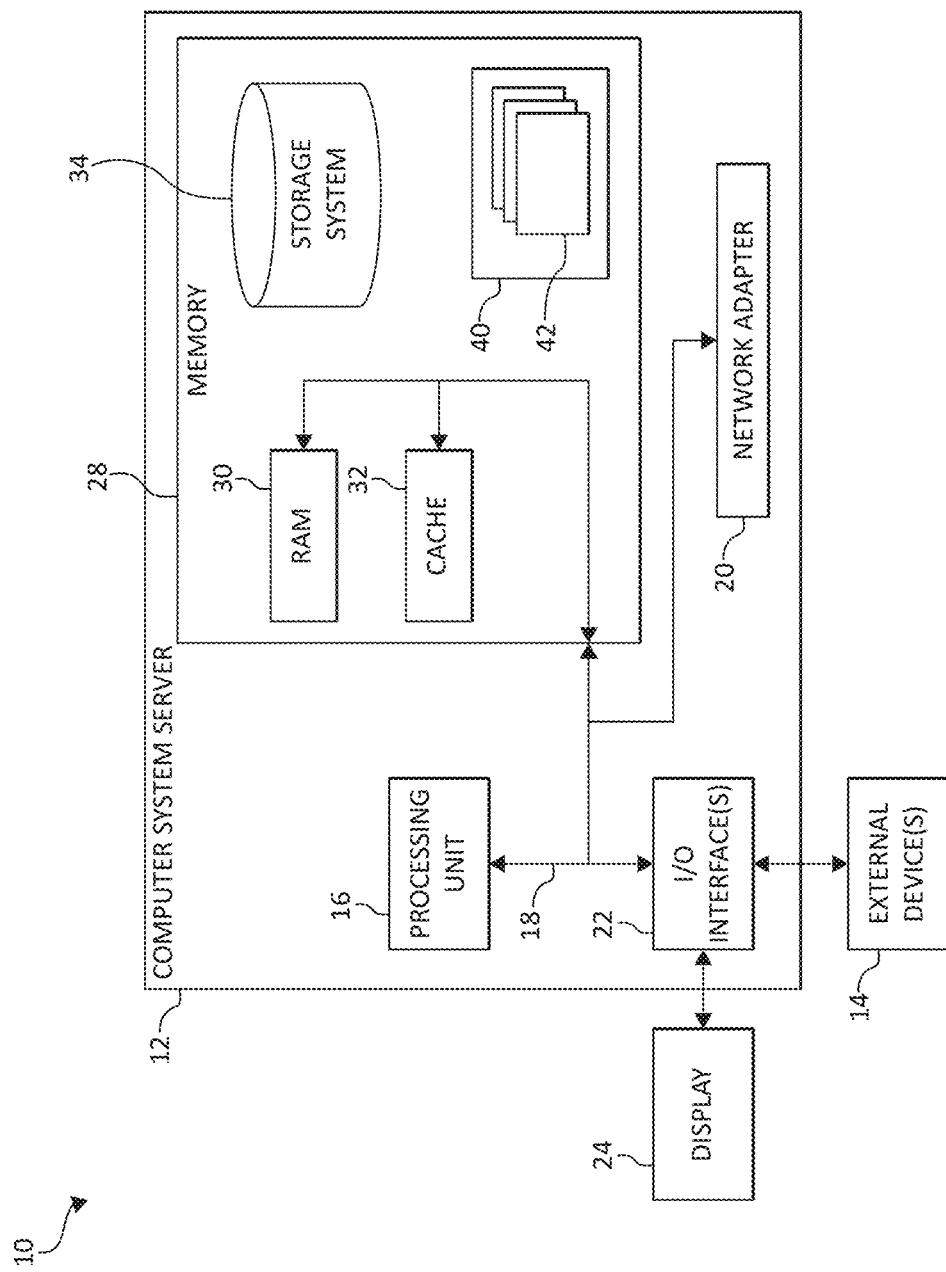
FIG. 1 is a block diagram depicting an exemplary computing node according to an embodiment of the present invention.

As discussed above, when content is posted to (or on) an online channel, such as a social media platform, other users or viewers (e.g., besides the original poster or content creator), such as "friends" or "contacts" of the content creator, are often able to post comments and ask questions about the content (i.e., post/create viewer engagement components), which typically appear in a dedication portion or panel, such as below the original content.

For example, if some aspects of the original content are not clear to some of the viewers, they may post questions asking for clarification. Additionally, the content creator may also post comments to, for example, respond to other comments, answer questions, and/or provide additional information.

As one example, consider a scenario in which a content creator creates or generates a post on a social media platform that is related to their recent travels (e.g., a vacation), which includes, for example, several photographs taken during the trip. Other users, or viewers, may post various comments and questions on the post, such as "How long did you stay?" or "What did you buy during the trip?" The content creator and/or other viewers may answer, or otherwise respond to, the questions/comments. For example, the content creator may answer the specific questions asked, while other viewers may post related comments, such as "I stayed there for a whole week a few years ago!"

In this way, the overall effect of the content is based on the original post by the content creator, as well as the contributions of other users. Through the interaction of viewers with the original post, the content may be considered to undergo a "maturation" or "evolution" process. As the content becomes increasingly "matured," it may be of interest to a greater number of viewers. For example, when the content is initially posted, and few viewer engagement components have been created or received, the content may generally only be of interest to the content creator's close friends and family (e.g., people who have a close relationship with the content creator). However, as the content matures, and a perhaps more details about the events related to the content are brought to light through the viewer engagement components, an increased number of viewers may find the content interesting.

As such, there is a need for online content, such as social media content, in some circumstances, to be distributed or propagated based on (or aligned with) content maturity.

To address these needs, some embodiments described herein provide methods and systems that, for example, control when (or under what circumstances) a piece of online content becomes viewable by (and/or is sent to, shared to, accessible by, etc.) viewers (e.g., friends or contacts of the content creator) based on the maturity or evolution of the content and/or the strength of the relationship between the content creator and the viewers.

For example, in some embodiments, when a piece of content is posted on an online channel, such as a social media platform, discussion forum, website, etc., it may be initially viewable by (or sent to or shared to) a relatively small group of viewers (e.g., 10 of the content creator's friends/contacts). Then, when the content matures beyond a particular threshold by, for example, viewers (and/or the content creator) posting comments, questions, etc., it may be sent/shared to a larger group of viewers (e.g., 100 of the content creator's friends/contacts). As the content continues to mature (or evolve), additional thresholds may be exceeded, such that the content may eventually be viewable by an even larger group of viewers (e.g., 200, 300, 500, etc. of the content creator's friends/contacts or other viewers associated with the content creator through the content creator's friends/contacts).

In some embodiments, the methods and systems described herein utilize a historical analysis of users' (content creator and/or viewers) reactions, comments, questions, etc. regarding previously posted content to identify an expected (or desired) maturity level (or threshold) of content for users (e.g., content creators, other users, viewers, etc.). Using such, when content is posted to an online channel, the maturity level thereof may be analyzed and/or monitored. When the maturity level reaches or exceeds the various thresholds, the appropriate users or viewers are given access to the content (i.e., the content becomes viewable to the viewers, the content is sent to/shared with the users, etc.). Thus, as the maturity level of the content increases, it becomes viewable to more and more users/viewers. In other words, users/viewers are dynamically provided access to the content as the maturity of the content increases.

For example, by analyzing previous content and the engagement of viewers therewith, the system may determine that some users (or viewers) prefer technical or statistical information associated with content, as they tend to interact with content after it has matured in such a way to include such information. In contrast, other users may interact with content early in the maturation process, such as by asking questions, thereby helping/assisting in the process. Using such a comparison, the content may be made viewable to some users before others.

As the maturity of the content continues to increase (e.g., via the auto-evolving mechanism of online content), the number of users to which the content is viewable also increases. That is, as the maturity level of the content increases, it may be considered to be appealing to a greater number of users or viewers (e.g., as indicated by the content maturity thresholds for the users/viewers), and thus shared with, sent to, and/or viewable by a greater number of viewers. In this manner, the content may be auto-propagated throughout the content creator's friends/contacts and/or other users of the online channel.

According to some embodiments described herein, a cognitive analysis is performed on various data sources to determine, for example, the maturity level (or score) of the content, the strength of the relationships between the content creator and other users/viewers (or potential viewers), and/or maturity thresholds for viewers. The data sources may include the content (the original content, along with the title, description, etc.), viewer engagement components posted to the content, and historical data related to the viewers' interaction with and/or reactions to previous content (e.g., posted on the same online channel or another online channel), along with any other data related to the viewers (e.g., a cognitive profile of the viewers may be generated based on any available data sources related to the viewers). The data may be retrieved (and/or scanned) from various online sources or channels, such as social media platforms (or networks), electronic messages (e.g., email, messaging, etc.), and various types of websites, such as video sharing (or streaming) websites, blogs, product review websites, discussion forums, etc. The cognitive analysis may include classifying natural language, analyzing tone, analyzing sentiment, analyzing semantic content, etc., perhaps including scanning for keywords, key phrases, etc. of previous online content, as well as other information related to the content (e.g., an identification of the channel, the audience/viewers, a title, label, and/or description of the content, etc.).

As such, in some embodiments, the methods and/or systems described herein may utilize "machine learning," "cognitive modeling," "cognitive analysis," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the maturity level of content, the strength of content creators' relationships with other viewers, and maturity level thresholds for viewers. Utilizing the models, the performance (or operation) of the system (e.g., utilizing/based on new inputs) may be predicted and/or the performance of the system may be optimized by investigating how changes in the input(s) effect the output(s). Users may provide feedback on the models, thus allowing the performance/accuracy of the system to improve over time.

In particular, in some embodiments, a method, by one or more processors, for managing distribution of online content is provided. Content posted to an online channel is detected. The content is viewable by a first number of viewers. A maturity score for the content is calculated. If the calculated maturity score is above a predetermined threshold, the content is caused to be viewable by a second number of viewers. The second number is greater than the first number.

A plurality of viewer engagement components associated with the content may be received. The calculating of the maturity score for the content may be based on a frequency at which the viewer engagement components are received. The calculating of the maturity score for the content may include determining a semantic distance between the content and at least some of the received viewer engagement components.

Key elements associated with the content may be determined. The calculating of the maturity score for the content may includes searching the content and the received viewer engagement component for the determined key elements.

The content may be associated with a user. A content maturity threshold for each of the viewers may be determined. The content maturity threshold may be associated with user content being viewable by each of the respective viewers.

At least one of the calculating of the maturity score for the content and the determining of the maturity threshold for each of the viewers may be performed utilizing a cognitive analysis.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
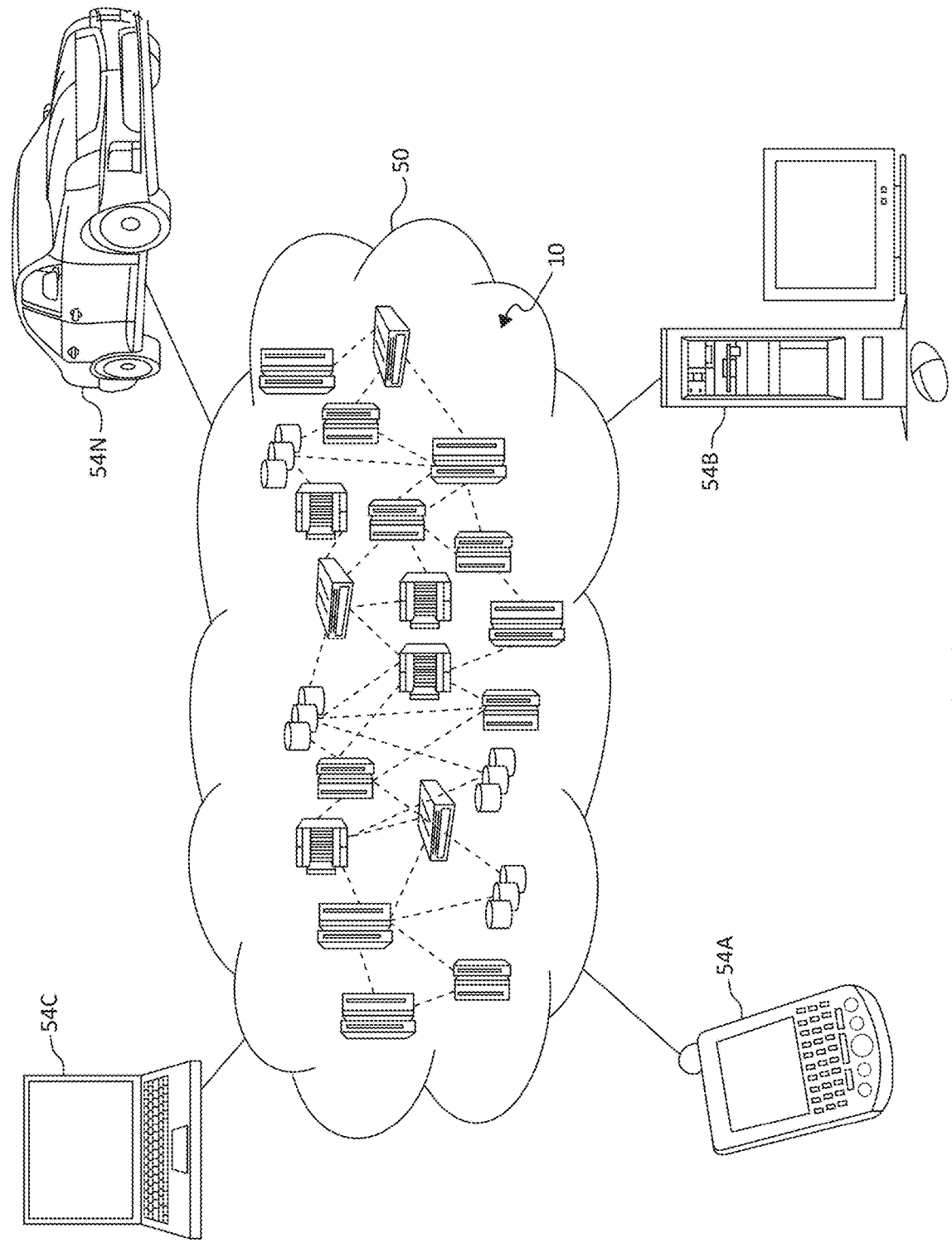
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
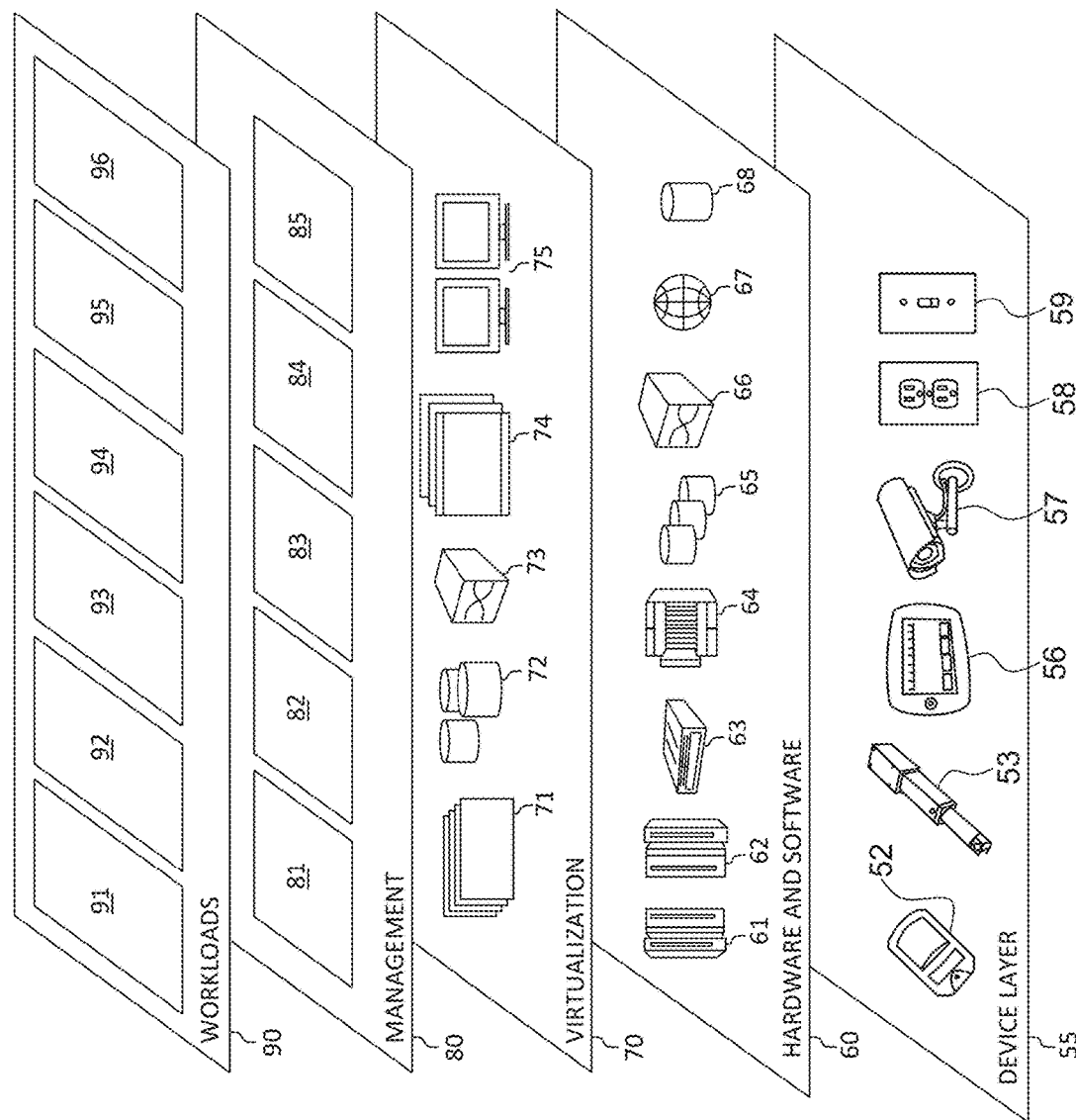
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing distribution of online content as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As mentioned above, some embodiments described herein provide methods and systems that, for example, control when (or under what circumstances) a piece of online content (e.g., posted on a social media platform) becomes viewable by (and/or is sent to, shared to, accessible by, etc.) viewers (e.g., friends or contacts of the content creator) based on the maturity or evolution of the content and/or the strength of the relationship between the content creator and the viewers.

That is, in some embodiments, online content (e.g., posted on a social media platform) is propagated (e.g., shared with, sent to, viewable by users) based on the maturity thereof. The maturity of the content may be related to the interaction or engagement with the content by users, including the content creator and other users/viewers. As the maturity of the content increases, it may become viewable by (and/or is made available to) more and more users.

In some embodiments, content may be bolstered and driven to maturity via, for example, user additions (e.g., viewer engagement components) or cognitive methods. The system's determination (or calculation) of content maturity (and/or a content maturity level or score) may be performed in several ways.

One method of determining or calculating content maturity utilizes the number of user comments (or other viewer engagement components) posted, perhaps over time (e.g., the frequency at which comments are posted). As the number plateaus (or stabilizes), that may be an indication of the maturity of the content. The semantic distance (and/or semantic similarity and/or semantic relatedness), as is commonly understood, between the original content and posted comments may (also) be used. That is, how closely the posted comments and questions are related to the original content may be considered to be indicative of content maturity. Specifically, when the semantic distance between the comments (on average) and the original content is detected as falling below a particular threshold, the maturity of the content may be considered as reaching a particular threshold.

In embodiments in which a maturity score is calculated, the score may be calculated on any suitable scare (e.g., positive or negative integers). In some embodiments, a maturity "grade" may be determined or calculated, such as "poor" or "good," or "low" or high," etc.

In some embodiments, the system may gain an understanding (e.g., via machine learning) of content maturity and/or completion by being provided with examples of what is considered mature content. For example, if a content creator posts content related to a trip or vacation, as determined using NLP and/or semantic content analysis, the content may be considered to be mature when the content (e.g., the original content and/or the posted comments/questions) includes or covers certain elements related to the topic, such as "who, what, where, why, and how," as is commonly understood, with respect to the trip/vacation.

In some embodiments, multiple levels of maturity may be defined with respect to a piece of content. For example, with respect to content related to a vacation, the who, what, where, etc., may be considered to be a first (relatively low) level of maturity, while a second (relatively high) level of maturity may be defined as other items or elements being covered, such as weather information, personal experiences, likelihood of the trip being repeated, etc. As described above, in some embodiments, when the content is detected as maturing from the first level to the second level, the number of viewers to which the content is accessible may be increased.

In some embodiments, once basic/key elements are defined for particular topics and/or various levels of maturity for content related to those topics, the system may learn, define, and/or propose new elements and/or maturity levels from analyzing content from multiple users (e.g., machine learning, NLP, semantic processing, etc.).

The dynamic configuration parameters mentioned above may be determined using feature extraction and NLP and used as inputs for a deep learning or neural network model, which may provide an active feedback to the user based on, for example, dynamic preferences (e.g., the level of information pre-decided by the user or learned based on historical additions to the thread/main post.)

In some embodiments, the strength of the relationships between the content creator and the (potential) viewers is utilized to determine the level of maturity (or maturity score) needed in order for particular viewers to have access to the content. Relationship strength may be determined or calculated based on, for example, number of interactions, the number of interlinks (or common connections, associations, contacts, etc.) between friends, the semantic content of interactions, the number of negative sentiment expressions in interactions, and/or other configurable parameters.

As discussed in greater detail below, the strength of the relationship between users (or between a content creator and another user/viewer) may be represented as or considered to be a distance (e.g., a radial distance) between the content creator (e.g., at the center) and the viewer. As the relationship gets weaker, the radial distance increases, and the other viewer becomes farther and farther removed from the content creator. However, as the maturity of content increases, it is propagated or distributed farther and farther from the content creator, such that users with weaker and weaker relationships with the content creator are able to view of the content.

In some embodiments, contextual and interest based information may be collected by an information engine (or computing device/system/module, such as those described above) and stored in a database (e.g., on the cloud) that is associated with the user (e.g., each user may have database associated therewith). A data processing engine (or computing device, module, etc.) may utilize unstructured data collected from various sources and perform unsupervised learning, such as k-means clustering, as is commonly understood in the art to categorize the data, thereby aligning repetitive data and habits for accuracy and conformity.

As such, related activities and content followed (or viewed, consumed, etc.) by the user (e.g., via a computing node) may be categorized within one objective output set with the respective information/keywords/highlights of the activity. For example, the gathered data may be analyzed, and key words may be identified. The data may then be categorized by name of person, name of an activity, name of a place, etc., and stored in the database. Multiple sets of such relationships (e.g., one for each of the user's contacts, friends, connections, etc. within the system) may be created and stored in the database associated with each user.

Figure 4:
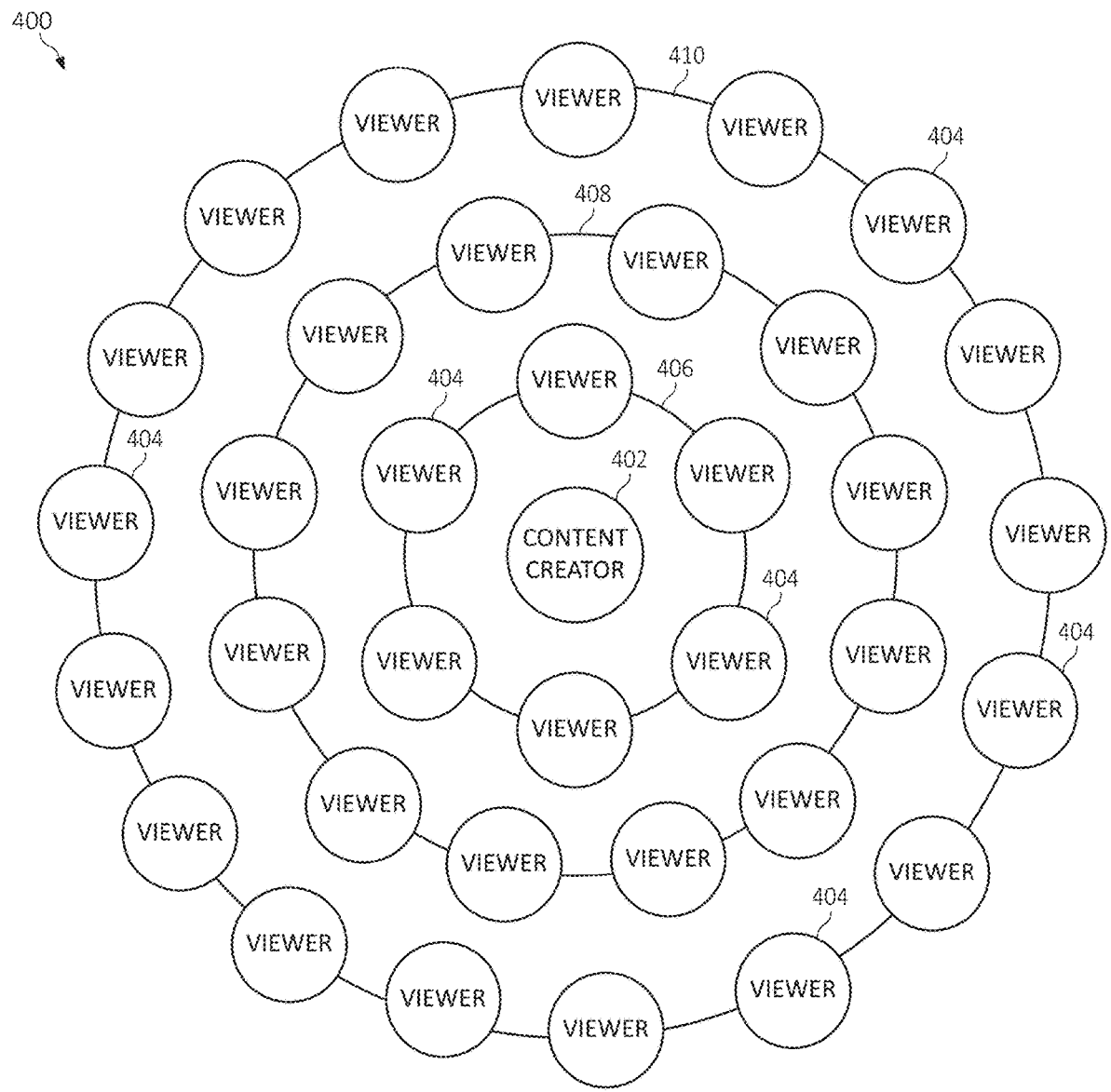
FIGS. 4-7 are schematic block diagrams of an online channels according to an embodiment of the present invention.

FIG. 4 is a simplified schematic illustration and/or block diagram of an online channel, such as a social media platform (or network) 400, or at least a portion thereof. In particular, FIG. 4 may be understood to show the strength of the relationships between a content creator (or primary user) 402 and multiple viewers (or secondary/other users) 404 and/or maturity thresholds for the viewers 404 with respect to content posted by the content creator 402. As shown, in the depicted embodiment, the viewers 404 are arranged in (or on) three concentric circles 406, 408, and 410 arranged about the content creator 402.

Circle 406 may correspond to a first (or relatively low) content maturity level, and the viewers 404 shown as being positioned on circle 406 may be understood to have relatively strong or close relationships with the content creator 402 and/or have relatively low maturity thresholds with respect to viewing content posted or created by the content creator 402. Circle 408 may correspond to a second (or medium) content maturity level, and the viewers 404 shown as being positioned on circle 408 may be understood to have medium/mid-level relationships with the content creator 402 and/or have mid-level maturity thresholds with respect to viewing content posted or created by the content creator 402. Circle 410 may correspond to a third (or relatively high) content maturity level, and the viewers 404 shown as being positioned on circle 410 may be understood to have relatively weak or distant relationships with the content creator 402 and/or have relatively high maturity thresholds with respect to viewing content posted or created by the content creator 402.

Figure 5:
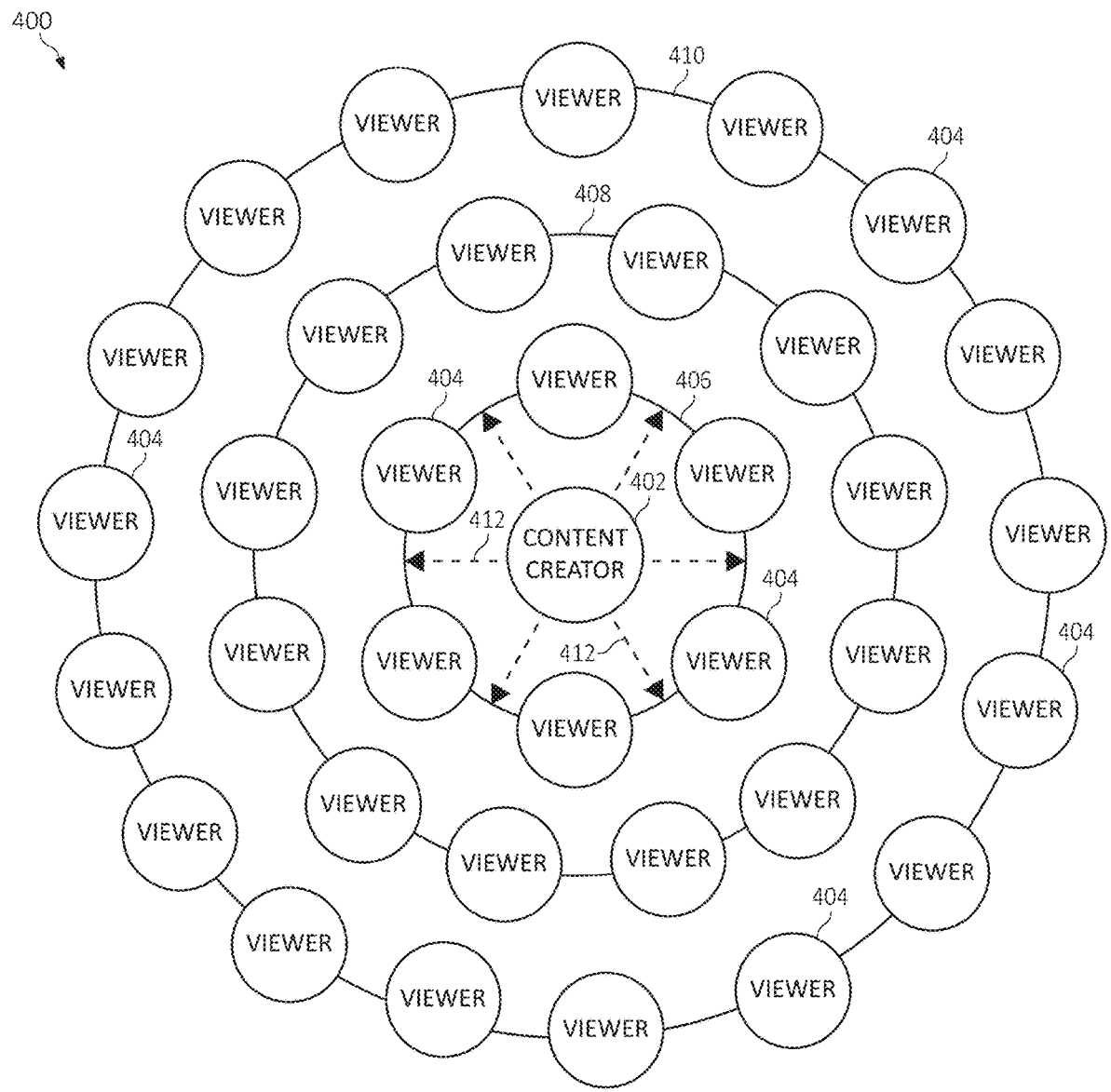

Referring now to FIG. 5, when content (or a piece of content), such as text, images, videos, audio files, etc., is posted (or created) on the online channel by the content creator 402, and has a relatively low maturity level (or score) (if any), the content is only propagated or distributed to the viewers 404 on (or in) circle 406, as indicated by distribution arrows 412. As such, as shown in FIG. 5, the content is initially only viewable by (or accessible by, sent to, shared to, etc.) the viewers 404 on circle 406 (i.e., viewers with relatively strong relationships with the content creator and/or viewers with relatively low maturity thresholds with respect to content posted by the content creator) and is not viewable by the viewers 402 on circles 408 and 410.

Figure 6:
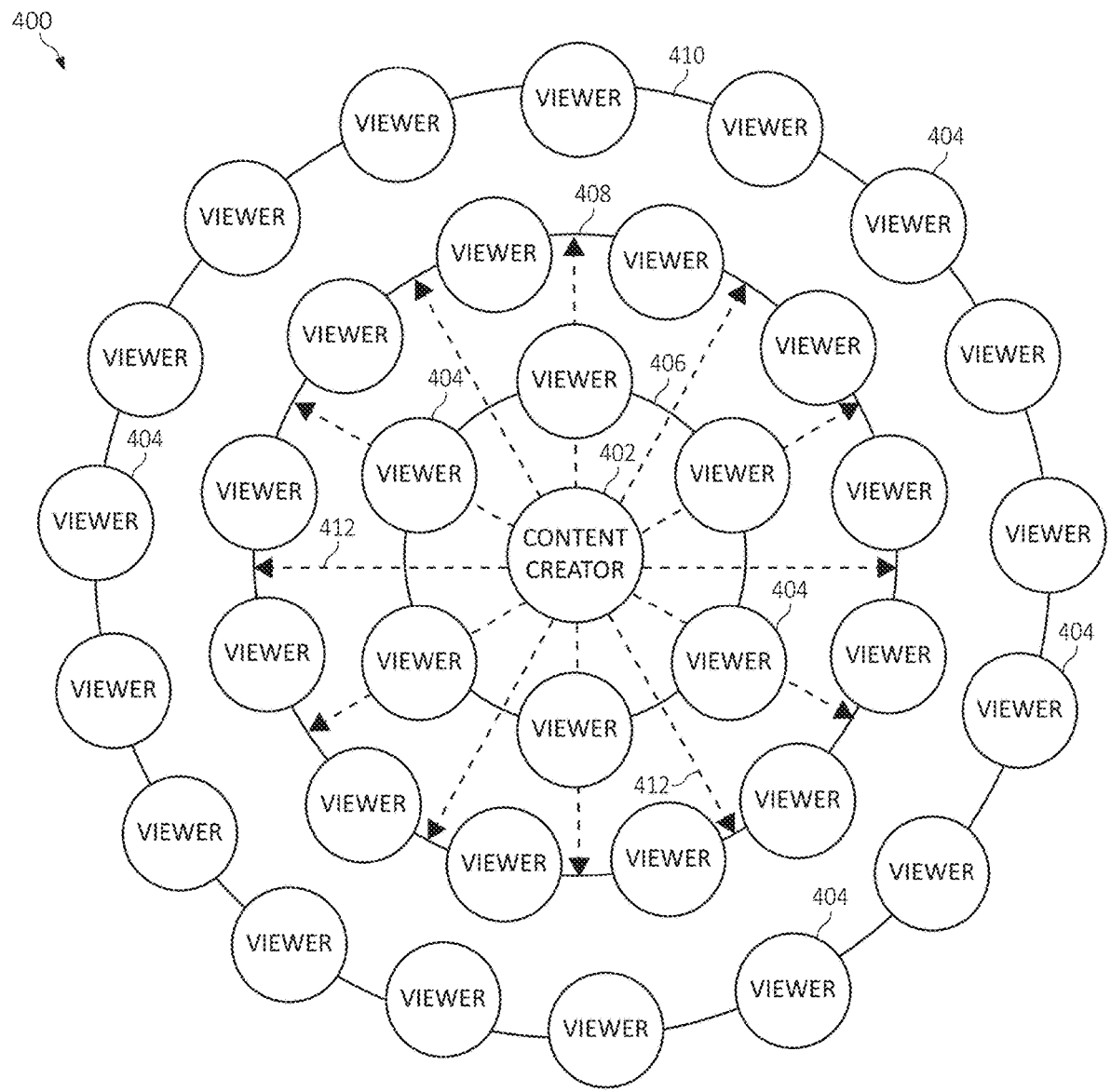

In some embodiments, as the maturity level of the content increases, as described above, the content is distributed to and/or viewable by an increased number of viewers. Referring now to FIG. 6, in the depicted embodiment, the increased distribution of the content is represented by the distribution arrows 412 which have been extended from the content creator 402 to circle 408. As such, as shown in FIG. 6, the maturity level of the content has increased such that the content has been distributed to the viewers 404 on circle 408 (i.e., the content has been distributed to viewers with the mid-level maturity thresholds with respect to content posted by the content creator), as well as the viewers 404 on circle 406 (i.e., the viewers to which the content was viewable when the content was initially posted).

Figure 7:
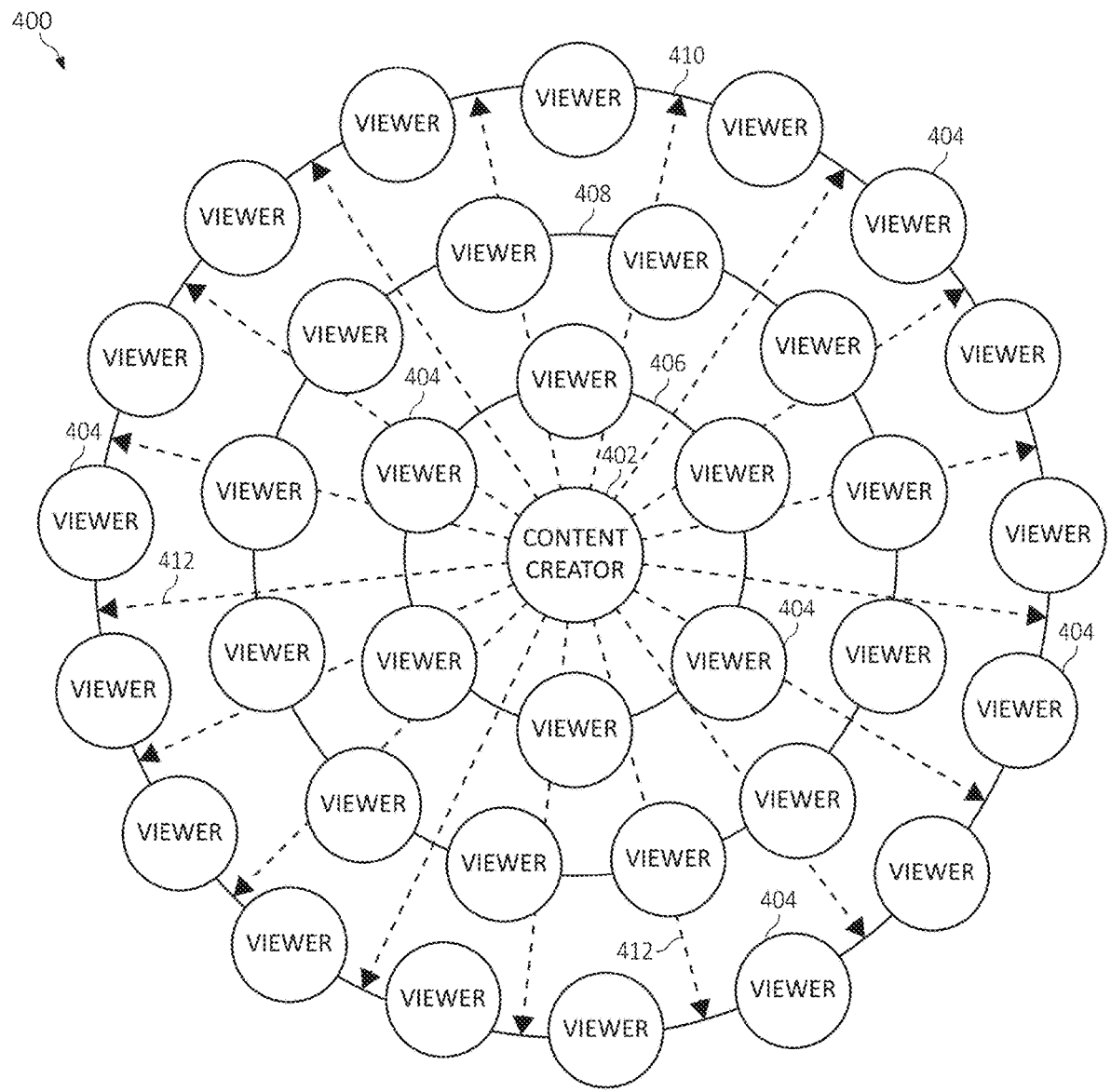

In some embodiments, as the maturity level of the content increases further, the number of viewers to which the content is distributed also continues to increase. Referring now to FIG. 7, in the depicted embodiment, the maturity level of the content has increased such that the content has been distributed to the viewers 404 on circle 410 (i.e., the viewers with the relatively high maturity thresholds with respect to content posted by the content creator), as well as the viewers 404 to which the content was previously viewable (i.e., the viewers on circle 406 and circle 408). In FIG. 7, the further distribution is represented by the distribution arrows 412 extending from the content creator 402 to circle 410. Thus, as described above, in some embodiments, as the maturity level (or score) of the content increases, the number of viewers to which the content is viewable (or accessible, etc.) also increases.

Figure 8:
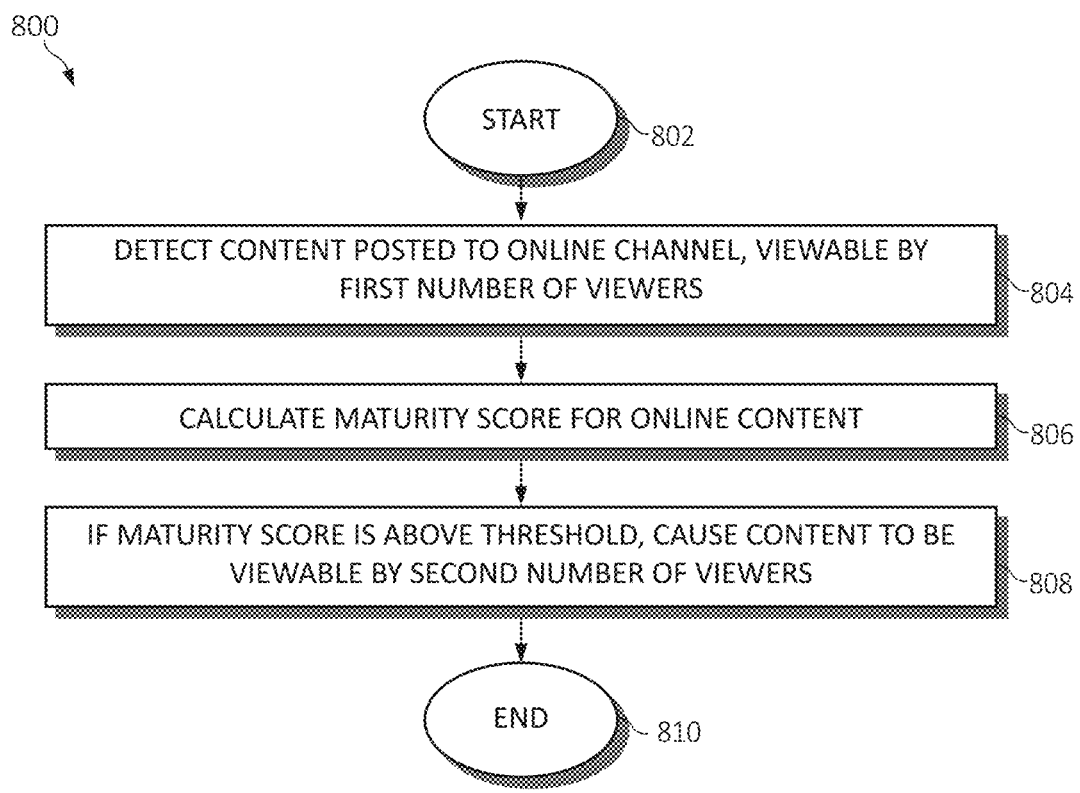
FIG. 8 is a flowchart diagram of an exemplary method for managing distribution of online content according to an embodiment of the present invention.

Turning to FIG. 8, a flowchart diagram of an exemplary method 800 for managing distribution of online content, according to some embodiments described herein, is provided. Method 800 begins (step 802) with, for example, a content creator (or primary user) registering with an online channel, such as a social media platform, and forming relationships (or associations) with potential viewers (secondary/other users, friends, family, contacts) of their content.

Content posted to the online channel (e.g., by the content creator) is detected (step 804). The content is (initially) viewable by a first number of viewers (e.g., a first number of the content creators friends, contacts, etc. on the online channel). The content may include, for example, text, images, video files, audio files, or any other type of content that may be posted to an online channel. In some embodiments, the content is posted such that viewers may interact with the content via viewer engagement components (e.g., posting comments/questions, indicating reactions, etc.).

A maturity score for the online content is calculated (step 806). The calculating of the maturity score for the content may be based on, for example, a frequency at which viewer engagement components are received and/or the number of viewer engagement components received (or posted to the content). In some embodiments, the calculating of the maturity score for the content may (also) include determining a semantic distance between the content and at least some of the received viewer engagement components. Key elements associated with the content may be determined. The calculating of the maturity score for the content may include searching the content and the received viewer engagement component for the determined key elements.

If the calculated maturity score is above a predetermined threshold, the content is caused to be viewable by a second number of viewers (and/or a signal representative thereof is generated) (step 808). The second number may be greater than the first number. That is, if the maturity score is determined to be above a threshold, the number of viewers to which the content is viewable, accessible, etc. may be increased. In some embodiments, a content maturity threshold for each of the viewers may be determined. The content maturity threshold may be associated with the content creator's content being viewable by each of the respective viewers. At least one of the calculating of the maturity score for the content and the determining of the maturity threshold for each of the viewers may be performed utilizing a cognitive analysis.

Method 800 ends (step 810) with, for example, the content being viewed by the second number of viewers and/or the second number of viewers interacting with the content, which may further increase the maturity score of the content. As described above, as the maturity score of the content increases further, the number of viewers to which the content is viewable may also be further increased. The process may be repeated when subsequent content is posted by the content creator (or another user). In some embodiments, the maturity score of the content is monitored such then when maturity thresholds for viewers are reached, the content becomes accessible to them. In some embodiments, users (e.g., content creators and/or viewers) are able to provide feedback to the system, which may be utilized to improve the performance of the system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing the distribution of online content comprising:
   detecting content posted to an online channel, wherein the content is viewable by a first number of viewers;
   receiving a plurality of viewer engagement components associated with the content;
   calculating a maturity score for the content, wherein calculating the maturity score includes determining a semantic distance between the content and at least some of the received viewer engagement components, wherein, when the semantic distance between the content and the at least some of the received viewer engagement components falls below a particular threshold indicative that a relevancy of the at least some of the received viewer engagement components with respect to the content has decreased, the calculated maturity score reaches a predetermined threshold, and wherein the semantic distance is computed as an average over all of the at least some of the received viewer engagement components; and
   when the calculated maturity score is above the predetermined threshold, causing the content to be viewable by a second number of viewers, wherein the second number is greater than the first number and wherein the second number increases commensurate with an increasing of the calculated maturity score for the content correspondent to the semantic distance indicative of the relevancy decreasing notwithstanding the content is withheld from being displayed to respective viewers of the second number of viewers until the content maturity score determined for the content matches a content maturity threshold set for the respective viewers of the second number of viewers.

2. The method of claim 1, wherein the calculating of the maturity score for the content is based on a frequency at which the viewer engagement components are received.

3. The method of claim 1, further including determining key elements associated with the content, and wherein the calculating of the maturity score for the content includes searching the content and the received viewer engagement component for the determined key elements.

4. The method of claim 1, wherein at least one of the calculating of the maturity score for the content and the determining of the maturity threshold for each of the viewers is performed utilizing a cognitive analysis.

5. A system for managing the distribution of online content comprising:
   at least one processor that
      detects content posted to an online channel, wherein the content is viewable by a first number of viewers;
      receives a plurality of viewer engagement components associated with the content;
      calculates a maturity score for the content, wherein calculating the maturity score includes determining a semantic distance between the content and at least some of the received viewer engagement components, wherein, when the semantic distance between the content and the at least some of the received viewer engagement components falls below a particular threshold indicative that a relevancy of the at least some of the received viewer engagement components with respect to the content has decreased, the calculated maturity score reaches a predetermined threshold, and wherein the semantic distance is computed as an average over all of the at least some of the received viewer engagement components; and
      when the calculated maturity score is above the predetermined threshold, causes the content to be viewable by a second number of viewers, wherein the second number is greater than the first number and wherein the second number increases commensurate with an increasing of the calculated maturity score for the content correspondent to the semantic distance indicative of the relevancy decreasing notwithstanding the content is withheld from being displayed to respective viewers of the second number of viewers until the content maturity score determined for the content matches a content maturity threshold set for the respective viewers of the second number of viewers.

6. The system of claim 5, wherein the calculating of the maturity score for the content is based on a frequency at which the viewer engagement components are received.

7. The system of claim 5, wherein the at least one processor further determines key elements associated with the content, and wherein the calculating of the maturity score for the content includes searching the content and the received viewer engagement component for the determined key elements.

8. The system of claim 5, wherein at least one of the calculating of the maturity score for the content and the determining of the maturity threshold for each of the viewers is performed utilizing a cognitive analysis.

9. A computer program product for managing distribution of online content by one or more processors, the computer program product comprising a non-transitory computer-readable storage medium having computer-readable program code portions stored therein, the computer-readable program code portions comprising:

an executable portion that detects content posted to an online channel, wherein the content is viewable by a first number of viewers;

an executable portion that receives a plurality of viewer engagement components associated with the content;

an executable portion that calculates a maturity score for the content, wherein calculating the maturity score includes determining a semantic distance between the content and at least some of the received viewer engagement components, wherein, when the semantic distance between the content and the at least some of the received viewer engagement components falls below a particular threshold indicative that a relevancy of the at least some of the received viewer engagement components with respect to the content has decreased, the calculated maturity score reaches a predetermined threshold, and wherein the semantic distance is computed as an average over all of the at least some of the received viewer engagement components; and an executable portion that, when the calculated maturity score is above the predetermined threshold, causes the content to be viewable by a second number of viewers, wherein the second number is greater than the first number and wherein the second number increases commensurate with an increasing of the calculated maturity score for the content correspondent to the semantic distance indicative of the relevancy decreasing notwithstanding the content is withheld from being displayed to respective viewers of the second number of viewers until the content maturity score determined for the content matches a content maturity threshold set for the respective viewers of the second number of viewers.

10. The computer program product of claim 9, wherein the calculating of the maturity score for the content is based on a frequency at which the viewer engagement components are received.

11. The computer program product of claim 9, wherein the computer-readable program code portions further include an executable portion that determines key elements associated with the content, and wherein the calculating of the maturity score for the content includes searching the content and the received viewer engagement component for the determined key elements.

12. The computer program product of claim 9, wherein at least one of the calculating of the maturity score for the content and the determining of the maturity threshold for each of the viewers is performed utilizing a cognitive analysis.

\* \* \* \* \*